(12) United States Patent
Yoshida et al.

(10) Patent No.: US 7,839,122 B2
(45) Date of Patent: Nov. 23, 2010

(54) CHARGING APPARATUS

(75) Inventors: Masato Yoshida, Kanagawa (JP); Ryou Watabe, Kanagawa (JP); Shigenori Arai, Kanagawa (JP); Kazuhisa Takada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 11/949,919

(22) Filed: Dec. 4, 2007

(65) Prior Publication Data

US 2008/0136264 A1 Jun. 12, 2008

(30) Foreign Application Priority Data

Dec. 12, 2006 (JP) ............................. 2006-334608

(51) Int. Cl.
*H02J 7/00* (2006.01)

(52) U.S. Cl. ...................... 320/128; 320/106; 320/107; 320/137

(58) Field of Classification Search ................. 320/106, 320/107, 111, 128, 130, 135, 134, 136, 137
See application file for complete search history.

(56) References Cited

U.S. PATENT DOCUMENTS

| | | | | |
|---|---|---|---|---|
| 5,872,445 | A * | 2/1999 | Ozawa et al. | 320/137 |
| 6,144,187 | A * | 11/2000 | Bryson | 320/137 |
| 6,252,379 | B1 * | 6/2001 | Fischl et al. | 320/134 |
| 6,777,915 | B2 * | 8/2004 | Yoshizawa et al. | 320/137 |
| 6,836,095 | B2 * | 12/2004 | Fogg | 320/128 |
| 2005/0017676 | A1 * | 1/2005 | Takimoto et al. | 320/107 |
| 2007/0108945 | A1 | 5/2007 | Ohashi et al. | |
| 2007/0216359 | A1 | 9/2007 | Arai et al. | |

FOREIGN PATENT DOCUMENTS

JP 2003 348766 12/2003

OTHER PUBLICATIONS

English language Abstract of JP 2003-348766.

* cited by examiner

*Primary Examiner*—Edward Tso
*Assistant Examiner*—M'Baye Diao
(74) *Attorney, Agent, or Firm*—Greenblum & Bernstein, P.L.C.

(57) ABSTRACT

There is provided a charging apparatus that, even when an AC adapter is connected and there is heavy load, makes it possible to reduce heat produced due to the power loss of a control transistor, reduce cost and area for implementation, and improve safety. Charging apparatus 100 has: P-channel MOS transistors M1 and M2 that control charging current; current detecting resistance Rs that is connected to current output terminals of P-channel MOS transistors M1 and M2 and detects the charging current; switch 130 that is arranged on a path that bypasses current detecting resistance Rs; and load 300 that receives power supply from battery 200 without involving current detecting resistance Rs when switch 130 is closed. Current difference amplifier 120 amplifies the detected voltage of current detecting resistance Rs, comparator 160 compares the output voltage of current difference amplifier 129 with the reference voltage, and thereby, when current flowing into battery 200 is equal to or less than a predetermined value, switch 130 is closed and current detecting resistance Rs is short-circuited.

5 Claims, 8 Drawing Sheets

CHARGING APPARATUS

CROSS REFERENCE TO RELATED APPLICATIONS

The disclosure of Japanese Patent Application No. 2006-334608, filed on Dec. 12, 2006, including the specification, drawings and abstract, is incorporated herein by reference in its entirety.

BACKGROUND OF THE INVENTION

1. Field of the Invention

The present invention relates to a charging apparatus that is provided in electronic devices such as mobile devices and that charges a battery by receiving power from a DC power supply such as an AC adapter.

2. Description of Related Art

In recent years, electronic devices such as mobile devices having batteries have charging apparatuses which use constant current charging control and constant voltage charging control as a method of controlling battery charging. Particularly, lithium-ion batteries have high energy density per unit volume and per unit mass, and enable reduction in size and weight of devices having the lithium-ion batteries. The schemes used for charging a lithium-ion battery include a constant voltage charging scheme that supplies charging current while maintaining a constant voltage of the battery, and a constant current/constant voltage charging scheme that charges the battery with a constant voltage after charging the battery with constant current. Both charging apparatuses adopting the above-described schemes detect that charging current becomes equal to or less than predetermined full charging current upon constant voltage charging and finish charging.

FIG. 1 is a circuit diagram showing a configuration of a conventional charging apparatus.

In FIG. 1, charging apparatus 10 adopts a configuration including: AC adapter input terminal 11 that receives the output DC voltage of an AC adapter; battery 12 such as a lithium battery; load circuit 13; charging section 14 configured with bipolar transistor Q1 and current detecting resistance Rs; current difference amplifier 15 that amplifies the voltage detected by current detecting resistance Rs; voltage difference amplifier 17 that amplifies the voltage difference between the battery voltage and the reference voltage generated by reference voltage source 16; voltage difference amplifier 19 that amplifies the voltage difference between the output voltage of current difference amplifier 15 and the reference voltage generated by reference voltage source 16; comparator 21 that compares the battery voltage with the reference voltage generated by reference voltage source 20; and switch 22 that selects one of the output (e) of voltage difference amplifier 19 and the output (d) of voltage difference amplifier 17 and applies the result to the base of bipolar transistor Q1.

Various types of electronic circuits in the electronic device provided with a charging apparatus are collectively referred to as load circuit 13, and load circuit 13 is connected so that power is supplied from battery 12. Further, the AC adapter shows constant current drooping characteristics.

Current detecting resistance Rs of charging section 14 detects current flowing into battery 12. The detected voltage is amplified by current difference amplifier 15. Bipolar transistor Q1 controls charging current flowing into battery 12 at constant current when the output of voltage difference amplifier 19 is selected for the base, and controls the battery voltage at a constant voltage when the output of voltage difference amplifier 17 is selected for the base. FIG. 2 is a timing chart that illustrates the constant current charging control and constant voltage charging control operations of the charging apparatus in FIG. 1, and shows the AC adapter voltage when the AC adapter is connected to AC adapter input terminal 11, the battery voltage, the charging current, the output voltage (d) of voltage difference amplifier 17, the output voltage (e) of voltage difference amplifier 19, the output voltage (f) of comparator 21 and the amount of heat (g) produced in bipolar transistor Q1.

Io is current flowing into load circuit 13, and Ibat is current flowing into battery 12. The solid lines in FIG. 2 show charging characteristic 1 (Io=Ibat) when no or little current is supplied to load circuit 13, and the dotted lines in FIG. 2 show charging characteristic 2 (Io>>Ibat) when large current is supplied to load circuit 13. Further, periods t1 and t2 in FIG. 2 are divided into t1-$i$ and t2-$i$, and t1-$ii$ and t2-$ii$ according to the weight of the load on load circuit 13. Periods t1 and t2 are divided into t1-$i$ and t2-$i$ in the case of charging characteristic 1, and divided into t1-$ii$ and t2-$ii$ in the case of charging characteristic 2.

The operation of above-described charging apparatus 10 in the case of charging characteristic 1 (Io=Ibat) where little current is supplied to load circuit 13, will be described in detail using the timing chart of FIG. 2.

[Period t1-$i$]

The AC adapter voltage is inputted to AC adapter input terminal 11, charging current increases, the AC adapter voltage decreases according to the constant current drooping characteristics of the AC adapter, and the battery voltage increases. In this period t1-$i$, the battery voltage still remains low, and so the output voltage (d) of voltage difference amplifier 17 becomes low.

When above (d) still remains low and (a) and (b) of switch 22 are connected, the output voltage (f) of comparator 21 becomes low by the connection of (a) and (b) of switch 22. By this means, charging apparatus 10 operates by constant current charging control by the AC adapter.

Fixed charging current flows, and so the output voltage (e) of voltage difference amplifier 19 becomes low.

In this period, by a small voltage difference between the AC adapter voltage and the battery voltage and the fixed level charging current based on constant current dropping characteristics of the AC adapter, low heat as shown in FIG. 2($g$) is produced due to the power loss of bipolar transistor Q1 until the battery voltage reaches a predetermined voltage.

Although a current value based on the constant current drooping characteristics of the AC adapter is used as charging current, when the AC adapter has high current supply capacity and the charging current based on the constant current drooping characteristics is too large, charging apparatus 10 is charged with constant current following the constant current control circuit in the charging apparatus.

[Period t2-$i$]

The battery voltage reaches the desired voltage, the AC adapter voltage returns to a predetermined voltage that does not cause droop, the charging current decreases, and the charging of the battery is completed. In this period t2-$i$, the battery voltage is almost fully charged, and so the output voltage (d) of voltage difference amplifier 17 becomes high.

When above (d) is high and (a) and (b) of switch 12 are connected, the output voltage (f) of comparator 21 becomes high. In FIG. 2, charging apparatus 10 operates by constant voltage charging control.

The charging current decreases, and so the output voltage (e) of voltage difference amplifier 19 increases.

Decreasing charging current in a state where a voltage difference between the AC adapter voltage and the battery voltage is high, results in a transition from a high heat produced state as shown in FIG. 2(g) to a low heat produced state due to the power loss of bipolar transistor Q1.

Apparatuses that perform the above-described charging control include the charging control circuit disclosed in Patent Document 1 (Japanese Patent Application Laid-Open No. 2003-348766), for example. The charging control circuit disclosed in Patent Document 1 switches the desired voltage for battery voltage by an external switch when the battery is charged using constant current charging control and constant voltage charging control.

However, such a conventional charging apparatus has the following problems.

If an electronic device is operated while the battery is being charged, heavy load is imposed on the battery. With charging apparatus 10 shown in FIG. 1, in constant voltage charging control, heat produced due to the power loss of bipolar transistor Q1 which is the charging transistor, poses a serious problem. Although current detecting resistance Rs is used to detect the amount of current flowing into the battery, if load is heavy while the battery is being charged, with the conventional configuration, it is not possible to distinguish between the current flowing into the battery and the load current. Therefore, although the charging of the battery is completed, the power supply path from the AC adapter to the battery is not switched, and consequently power is continuously supplied from the AC adapter, and the power loss by the charging transistor occurs continuously.

The case of charging characteristic 2 (Io>>Ibat) where large current is supplied to load circuit 13 in the constant voltage charging operation of charging apparatus 10 shown in FIG. 1 will be described using the timing chart of FIG. 2. In addition, the period for charging characteristic 2 is shown as period t1-*ii* and t2-*ii*.

[Period ti-*ii*]

The AC adapter voltage is inputted to AC adapter input terminal 11, the charging current increases, the AC adapter voltage decreases, and the battery voltage increases. As a result of Io>>Ibat, it takes the battery voltage a longer time to increase than in the case of charging characteristic 1.

[Period t2-*ii*]

Although the charging current decreases, the AC adapter voltage returns to a predetermined voltage, the battery voltage reaches the desired voltage, and the current flowing into battery 12 Ibat decreases, the current supplied to load circuit 13 continues flowing. In this period, by a large voltage difference between the AC adapter voltage and the battery voltage and the current supplied to load circuit 13, a high heat produced state as shown in FIG. 2(g) continues due to the power loss of bipolar transistor Q1.

In order to endure this heat production, bipolar transistor Q1 needs to be configured with components having high heat resistance and be implemented on a board that is designed to release heat. This causes an increase in cost. Further, in limited space of mobile devices, or the like, this causes a substantial increase in area for implementing components.

SUMMARY OF THE INVENTION

It is therefore an object of the present invention to provide a charging apparatus that, even when the AC adapter is connected and there is heavy load, makes it possible to reduce heat produced due to the power loss of a control transistor, reduce cost and area for implementation, and improve safety.

According to an aspect of the invention, a charging apparatus charges a secondary battery from a DC power supply via a control transistor and is configured including: a current detecting resistance that is connected to a current output terminal of the control transistor and that detects charging current; a switch section that is arranged on a path that bypasses the current detecting resistance; and a control section that detects current flowing into the secondary battery, and closes the switch section and short-circuits the current detecting resistance when the detected current is equal to or less than a predetermined value.

DETAILED DESCRIPTION OF THE PREFERRED EMBODIMENT

Embodiments of the present invention will be described in detail below with reference to the accompanying drawings.

Embodiment 1

Figure 3:
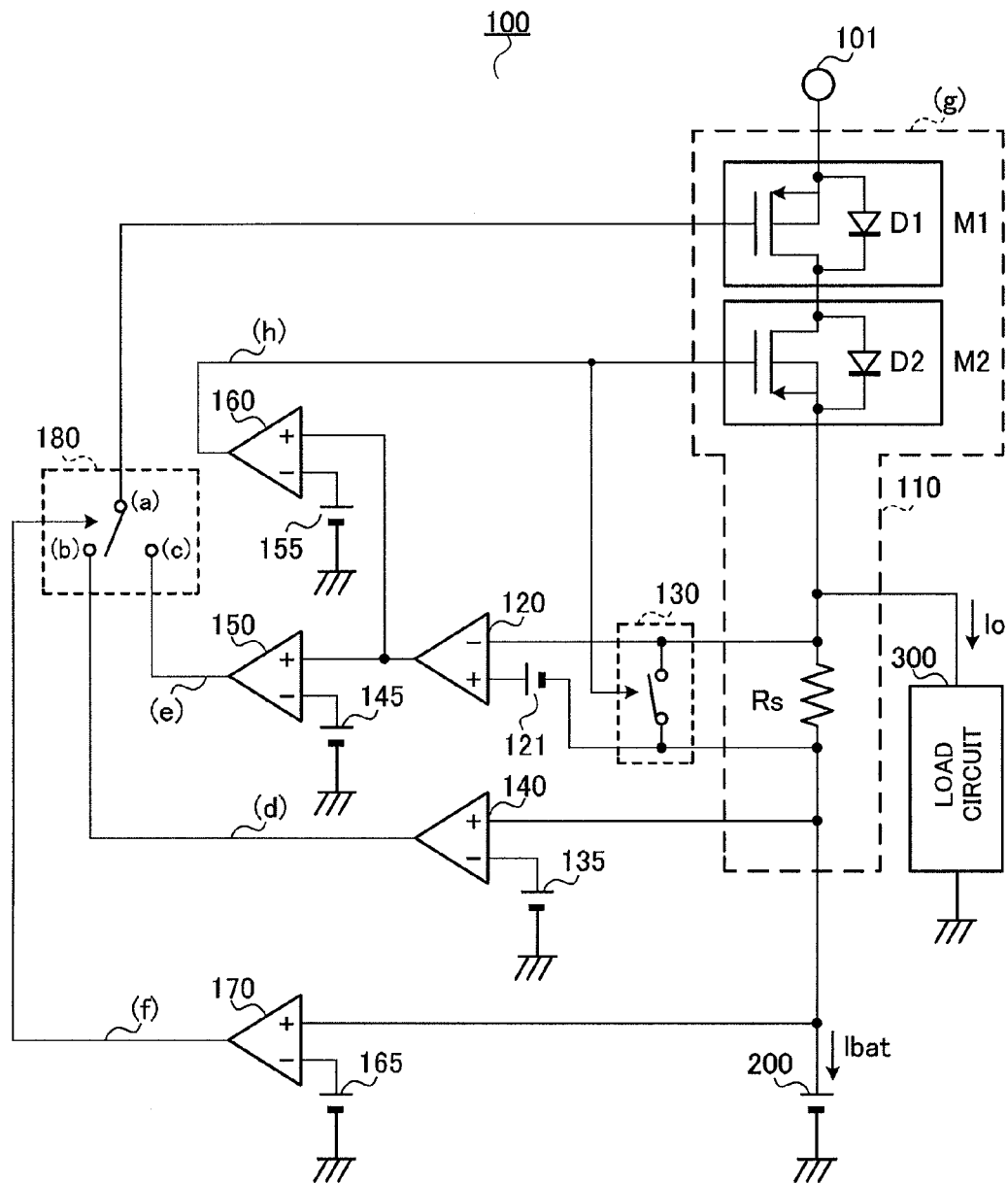
FIG. 3 is a circuit diagram showing a configuration of a charging apparatus according to Embodiment 1 of the present invention.

FIG. 3 is a circuit diagram showing a configuration of the charging apparatus according to Embodiment 1 of the present invention. An example will be described here with this embodiment where the charging apparatus is applied to charging control circuits that charge the batteries of mobile devices.

In FIG. 3, charging apparatus 100 charges battery 200 such as a lithium battery from an AC adapter which is a DC power supply, via a control transistor and current detecting resistance Rs.

Charging apparatus 100 adopts a configuration including: AC adapter input terminal 101 that receives an output DC voltage of an AC adapter; P-channel MOS transistors M1 and M2 (control transistors) that control charging current based on a signal of a terminal voltage (for example, gate terminal voltage); current detecting resistance Rs that detects the charging current of P-channel MOS transistors M1 and M2; charging section 110 that is configured with P-channel MOS transistors M1 and M2 and current detecting resistance Rs; current difference amplifier 120 that has a negative input terminal connected between P-channel MOS transistor M2 and current detecting resistance Rs, a positive input terminal connected between current detecting resistance Rs and battery 200 via constant voltage source 121, and that amplifies the detected voltage of current detecting resistance Rs; switch 130 that short-circuits current detecting resistance Rs based on a comparison result of comparator 160; voltage difference amplifier 140 that amplifies the voltage difference between the battery voltage and the reference voltage generated by reference voltage source 135; voltage difference amplifier 150 that amplifies the voltage difference between the output voltage of current difference amplifier 120 and the reference voltage generated by reference voltage source 145; comparator 160 that compares the output voltage of current difference amplifier 120 with the reference voltage generated by reference voltage source 155; comparator 170 that compares the output voltage of current difference amplifier 140 with the reference voltage generated by reference voltage source 165; switch 180 that selects one of the output (e) of voltage difference amplifier 150 and the output (d) of voltage difference amplifier 140 and applies the result to the gate of P-channel MOS transistor M1.

Current detecting resistance Rs detects current flowing into battery 200. Current difference amplifier 120 amplifies the detected voltage of current detecting resistance Rs and outputs the result as a current difference.

P-channel MOS transistor M1 controls the charging current for battery 200 at constant current when the output of voltage difference amplifier 150 is selected for the gate, and controls the battery voltage at a constant voltage when the output of voltage difference amplifier 140 is selected for the gate.

P-channel MOS transistor M2 prevents countercurrent from battery 200 to AC adapter input terminal 101. Further, D1 is a parasitic diode of P-channel MOS transistor M1, and D2 is a parasitic diode of P-channel MOS transistor M2.

Figure 4:
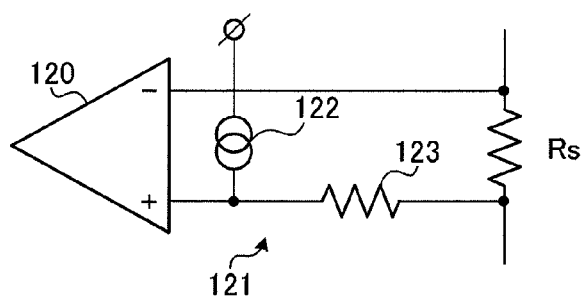
FIG. 4 is a circuit diagram showing a specific configuration of a current difference amplifier of the charging apparatus in FIG. 3.

FIG. 4 is a circuit diagram showing a specific configuration of current difference amplifier 120.

As shown in FIG. 4, current difference amplifier 120 has constant voltage supply 121 configured with constant current supply 122 and resistance 123 connected to the positive input terminal. Constant voltage source 121 shifts the input potential of the positive input terminal of current difference amplifier 120 by predetermined potentials.

Figure 1:
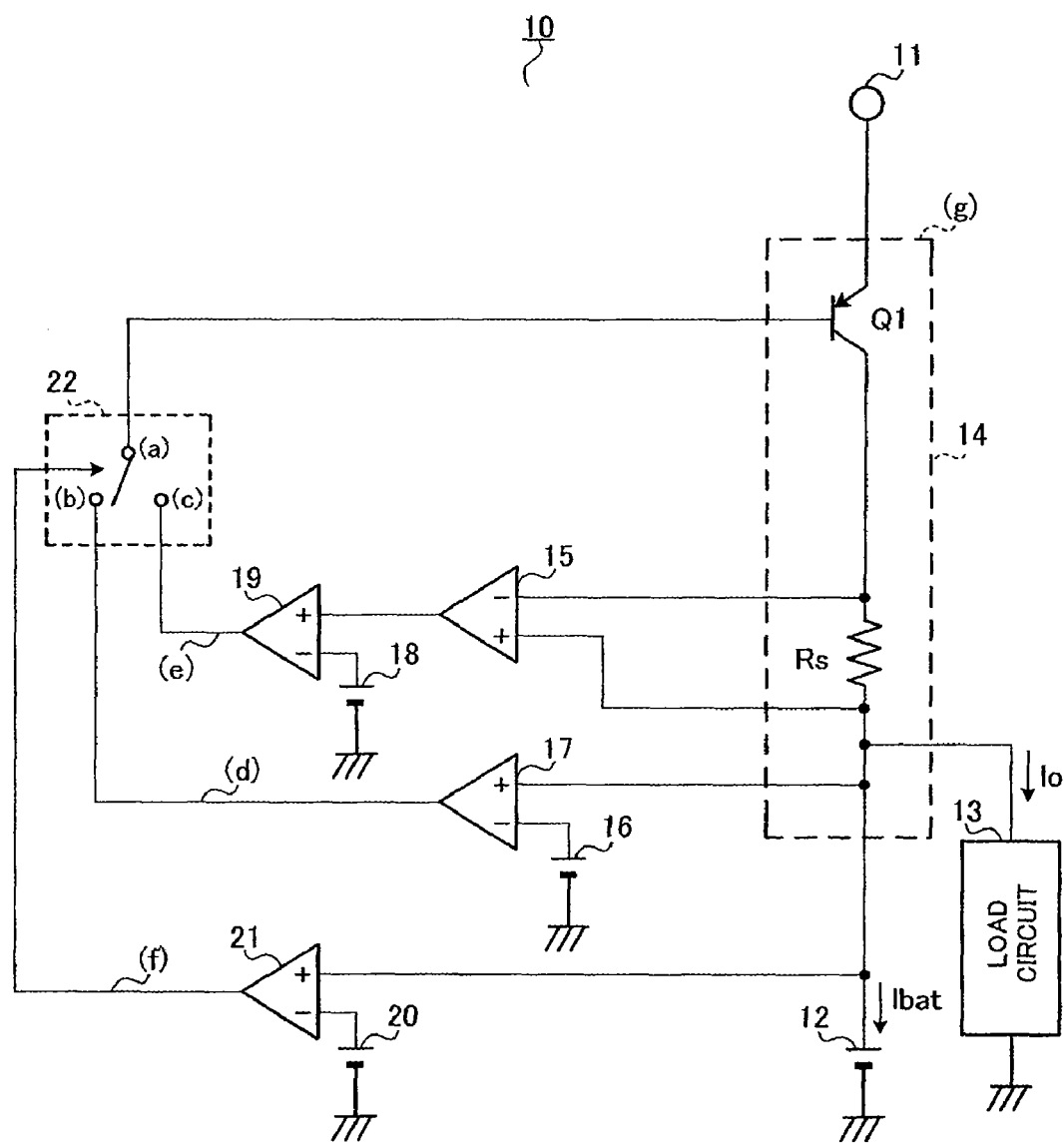
FIG. 1 is a circuit diagram showing a configuration of a conventional charging apparatus.
Figure 2:
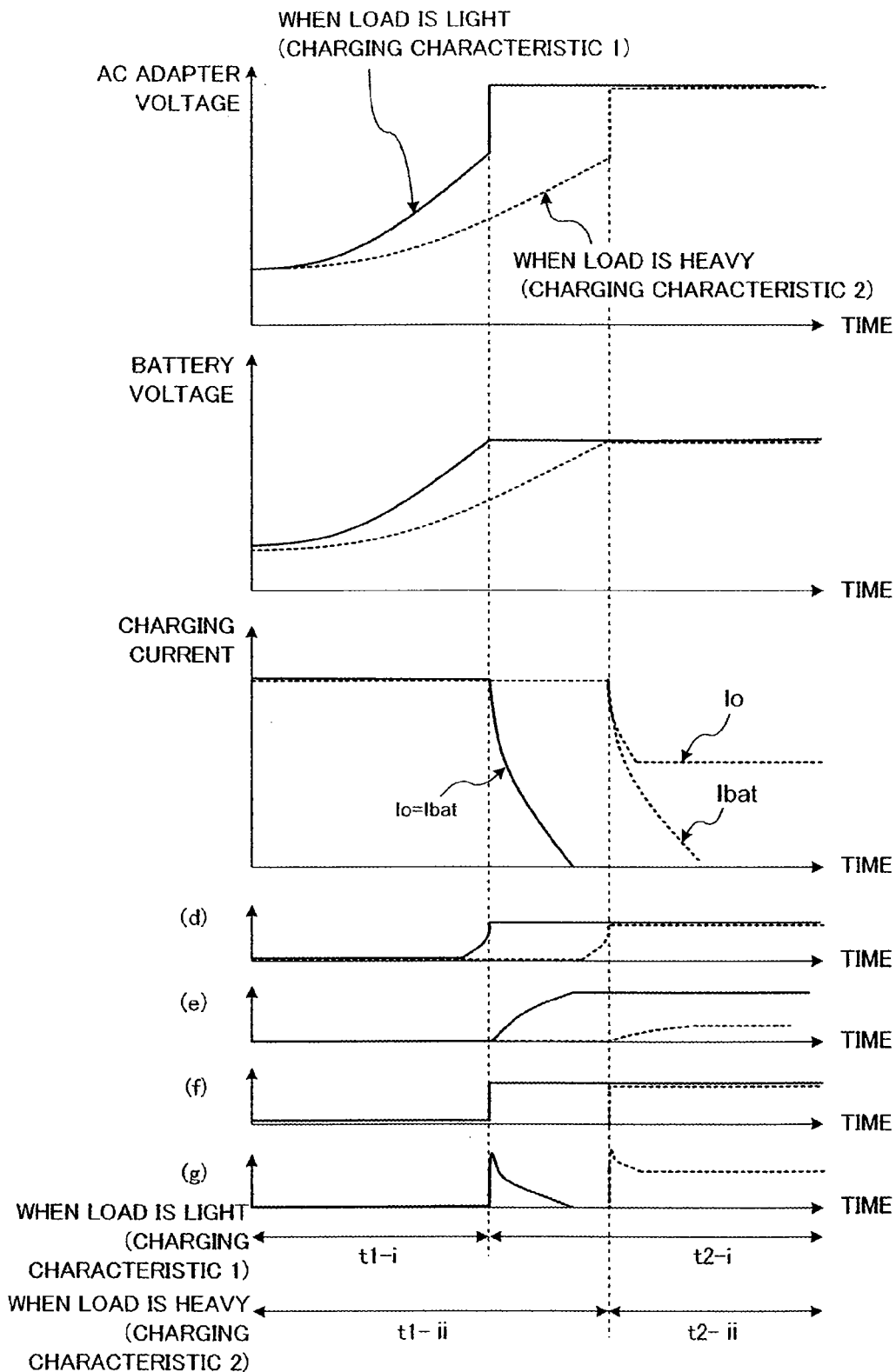
FIG. 2 is a timing chart illustrating the operation of the conventional charging apparatus.

Various types of electronic circuits in the electronic device provided with charging apparatus 100 are collectively referred to as load circuit 300, and load circuit 300 is connected so that, when current flowing into battery 200 is equal to or less than a predetermined value, current detecting resistance Rs is short-circuited and power is supplied from battery 200 via switch 130. To be more specific, load circuit 300 is connected between P-channel MOS transistor M2 and current detecting resistance Rs. When switch 130 is closed, power is supplied to load circuit 300 from battery 200 via switch 130. However, in the conventional example shown in FIG. 1, load circuit 13 in FIG. 1 is connected between current detecting resistance Rs and battery 12. The conventional example is also different from this embodiment in the connecting position of load circuit 300 that is connected to charging apparatus 100.

Further, the AC adapter shows constant current drooping characteristics.

Figure 5:
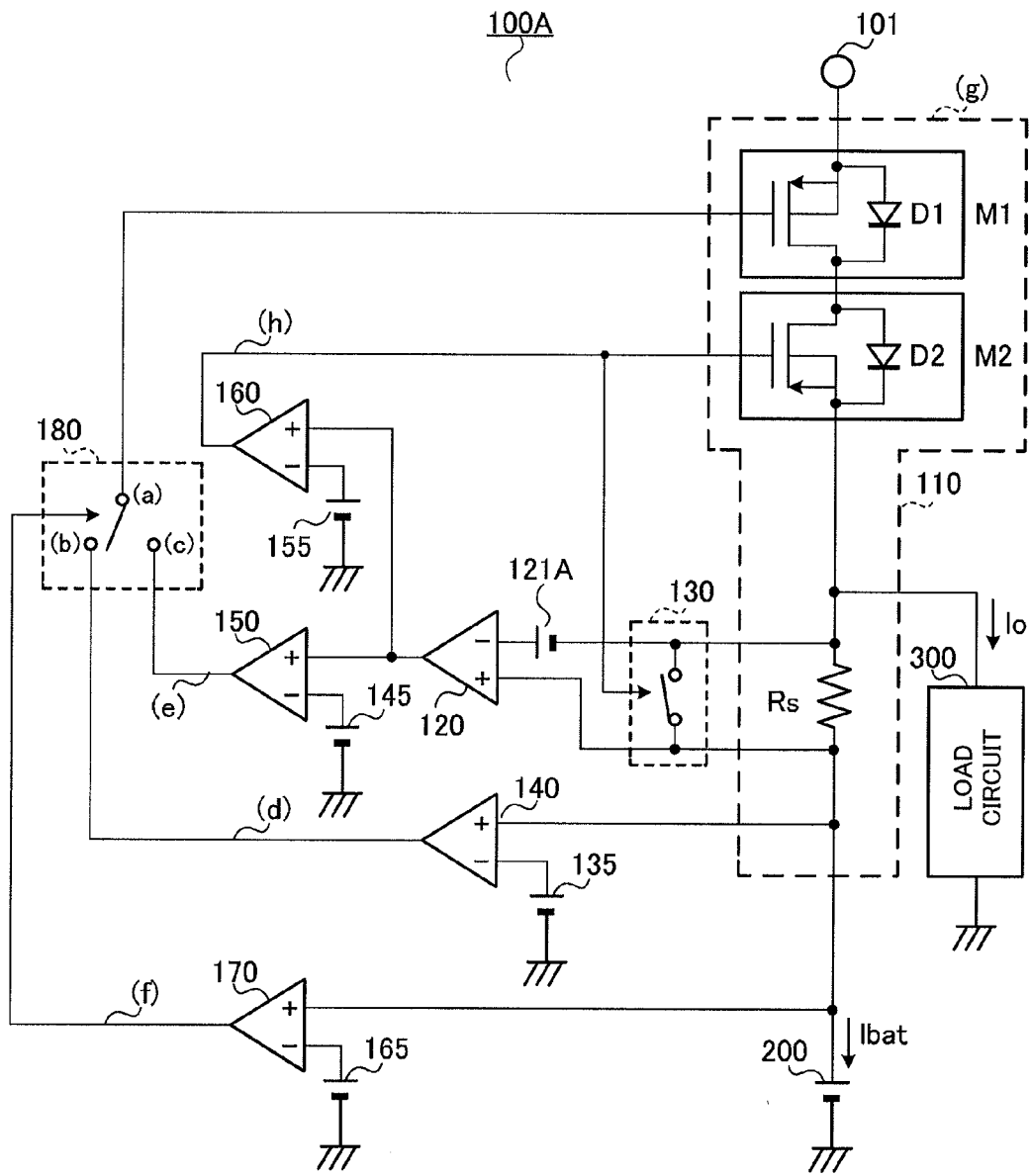
FIG. 5 is a circuit diagram showing another configuration of the charging apparatus according to Embodiment 1.
Figure 6:
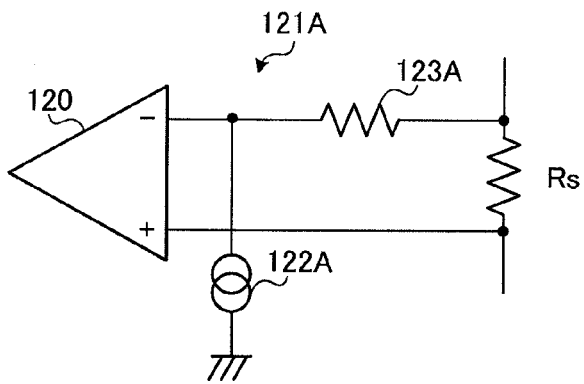
FIG. 6 is a circuit diagram showing a specific configuration of a current difference amplifier of the charging apparatus in FIG. 5.

FIGS. 5 and 6 are circuit diagrams showing other configurations of the charging apparatus according to Embodiment 1. The only difference is the configuration of the input terminal part of the current difference amplifier connected to current detecting resistance Rs.

In FIG. 5, in current difference amplifier 120 of charging apparatus 100A, the negative input terminal is connected between P-channel MOS transistor M2 and current detecting resistance Rs via constant voltage source 121A, and the positive input terminal is connected between current detecting resistance Rs and battery 200.

Further, as shown in FIG. 6, current difference amplifier 120 of charging apparatus 100A has constant voltage source 121A configured with constant current supply 122A and resistance 123A connected to the negative input terminal. Constant voltage source 121A shifts the input potential of the negative input terminal of current difference amplifier 120 by predetermined potentials.

The operation of the charging apparatus configured as described above will be described below. Charging apparatus 100 in FIG. 3 operates in the same way as charging apparatus 100A in FIG. 5, and therefore only the operation of charging apparatus 100 will be described as an example.

Figure 7:
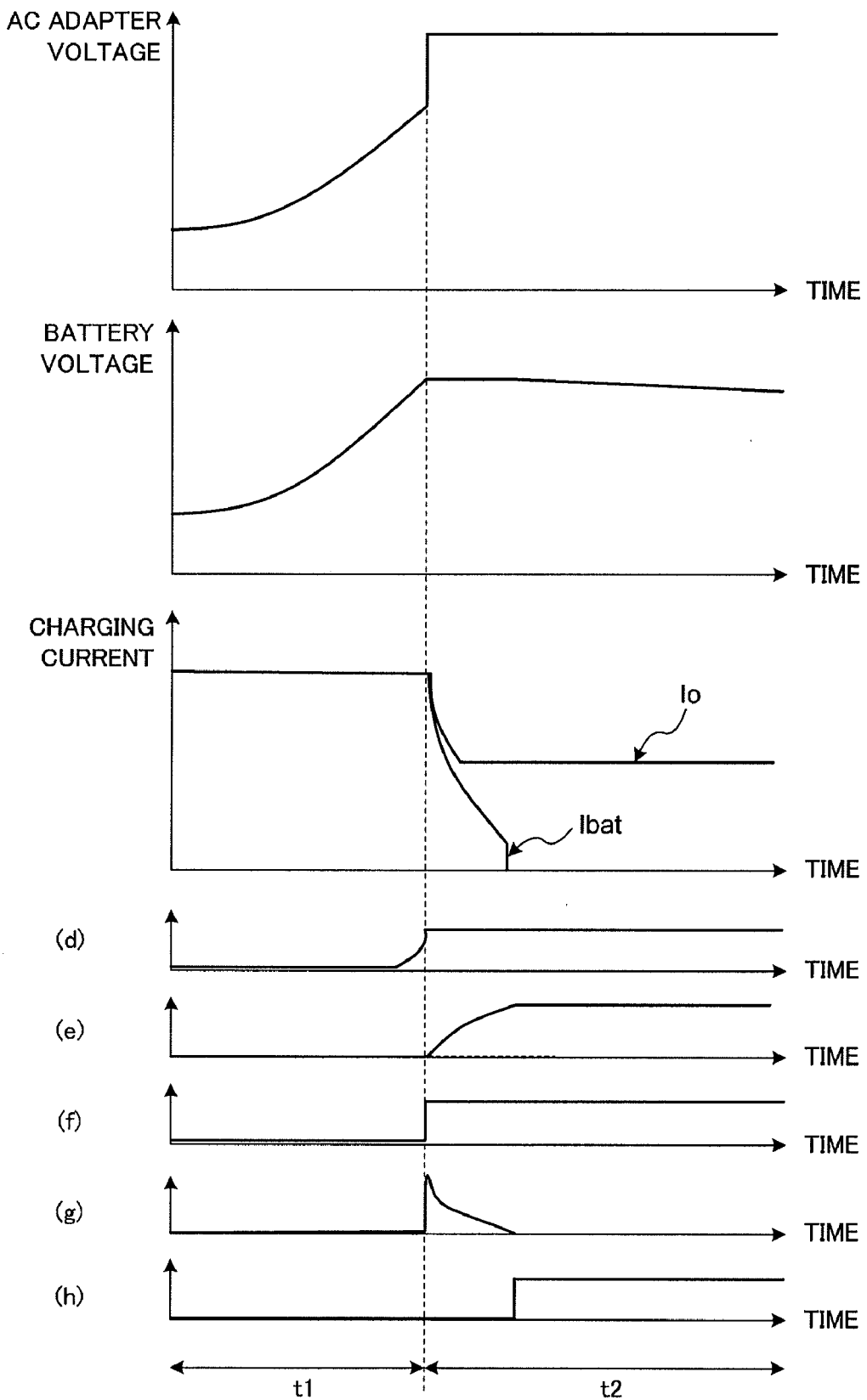
FIG. 7 is a timing chart illustrating the operation of the charging apparatus according to Embodiment 1.

FIG. 7 is a timing chart illustrating the operation of charging apparatus 100, and shows the operation timing and waveform of each section in FIG. 3. FIG. 7 shows an AC adapter voltage when the AC adapter is connected to AC adapter input terminal 101, the battery voltage, the charging current, the output voltage (d) of voltage difference amplifier 140, the output voltage (e) of voltage difference amplifier 150, the output voltage (f) of comparator 170, the amount of heat (g) produced in P-channel MOS transistor M1, and the output voltage (h) of comparator 160. Further, Io is current flowing into load circuit 300, and Ibat is current flowing into battery 200.

The operation of above-described charging apparatus 100 for a case where large current is supplied to load circuit 300 (Io>>Ibat) will be described in detail using the timing chart of FIG. 7.

[Period t1]

The AC adapter voltage is inputted to AC adapter input terminal 101, the charging current increases, the AC adapter voltage decreases, and the battery voltage increases. In this period ti, the battery voltage still remains low, and so the output voltage (d) of voltage difference amplifier 140 becomes low.

When above (d) still remains low and (a) and (b) of switch 180 are connected, the output voltage (f) of comparator 170 becomes low, and so charging apparatus 100 operates by constant current charging control.

Further, fixed charging current flows, and so the output voltage (e) of voltage difference amplifier 150 becomes low.

The output voltage of current difference amplifier 120 is low, and so the output voltage (h) of comparator 160 becomes low, P-channel MOS transistor M2 is not opened, switch 130 is opened, and consequently current detecting resistance Rs is not short-circuited.

In this period, by a small voltage difference between the AC adapter voltage and the battery voltage and fixed level charging current, low heat is produced as shown in FIG. 7(g) due to the power loss of P-channel MOS transistor M1 until the battery voltage reaches a predetermined voltage.

[Period t2]

The charging current decreases, the AC adapter voltage returns to a predetermined voltage that does not cause droop, the battery voltage reaches the desired voltage, and the current flowing into battery 200 Ibat decreases, but load continues flowing as supply current for load circuit 300. In this period t2, the battery voltage is almost fully charged, and so the output voltage (d) of voltage difference amplifier 140 becomes high.

When above (d) is high and (a) and (c) of switch 180 are connected, the output voltage (f) of comparator 170 becomes high, and so charging apparatus 100 operates by constant voltage control.

Further, the charging current decreases, and the output voltage (e) of voltage difference amplifier 150 increases.

The output voltage of current difference amplifier 120 is high, and so the output voltage (h) of comparator 160 becomes high, P-channel MOS transistor M2 is opened, switch 130 is closed, and consequently current detecting resistance Rs is short-circuited. Therefore, power is directly supplied to load circuit 300 from battery 200 where charging is finished, via switch 130.

In this way, even when the AC adapter is connected and there is heavy load, after charging is completed, power is supplied to the load from the battery via switch 130, so that it is possible to reduce heat produced due to the power loss by the charging control transistor.

As described in detail above, according to this embodiment, charging apparatus 100 has: P-channel MOS transistors M1 and M2 that control charging current; current detecting resistance Rs that is connected to the current output terminals of P-channel MOS transistors M1 and M2; current difference amplifier 120 that amplifies the detected voltage of current detecting resistance Rs; switch 130 that is arranged on a path that bypasses current detecting resistance Rs; comparator 160 that compares the output voltage of current difference amplifier 120 with a reference voltage generated by reference voltage source 155; and load 300 that receives power supply from battery 200 without involving current detecting resistance Rs when switch 130 is closed. Current difference amplifier 120 amplifies the detected voltage of current detecting resistance Rs, and comparator 160 compares the output voltage of current difference amplifier 120 with the reference voltage, and thereby, when current flowing into battery 200 is equal to or less than a predetermined value, switch 130 is closed and current detecting resistance Rs is short-circuited. Therefore, even when the AC adapter is connected and there is heavy load, if battery 200 is almost fully charged, charging apparatus 100 supplies power to load circuit 300 from battery 200 via switch 130. By this means, it is possible to reduce heat produced in P-channel MOS transistors M1 and M2 which are control transistors. The reduction in the heat produced in the control transistors makes it possible to use a general-purpose transistor which has low heat resistance and design a board for implementation that releases heat in a simple manner. Therefore, it is possible to prevent the power loss of the control transistor, reduce heat produced due to this powerless, reduce cost and area for implementation, and, furthermore, improve safety.

A case has been described above where a current value according to the constant current drooping characteristics of the AC adapter is used as charging current. When the current supply capacity of the AC adapter is high and too large current is supplied by the charging current according to the constant current drooping characteristics, charging apparatus 100 is charged with constant current following the constant current control function in the charging apparatus. In this embodiment, switch 130 is opened upon this constant current control, and P-channel MOS transistors M1 and M2 (control transistors) do not relate to an effect of reducing heat production. A case will be also described with Embodiment 2 and other embodiments where constant current control according to the constant current drooping characteristics of the AC adapter is performed.

Embodiment 2

Figure 8:
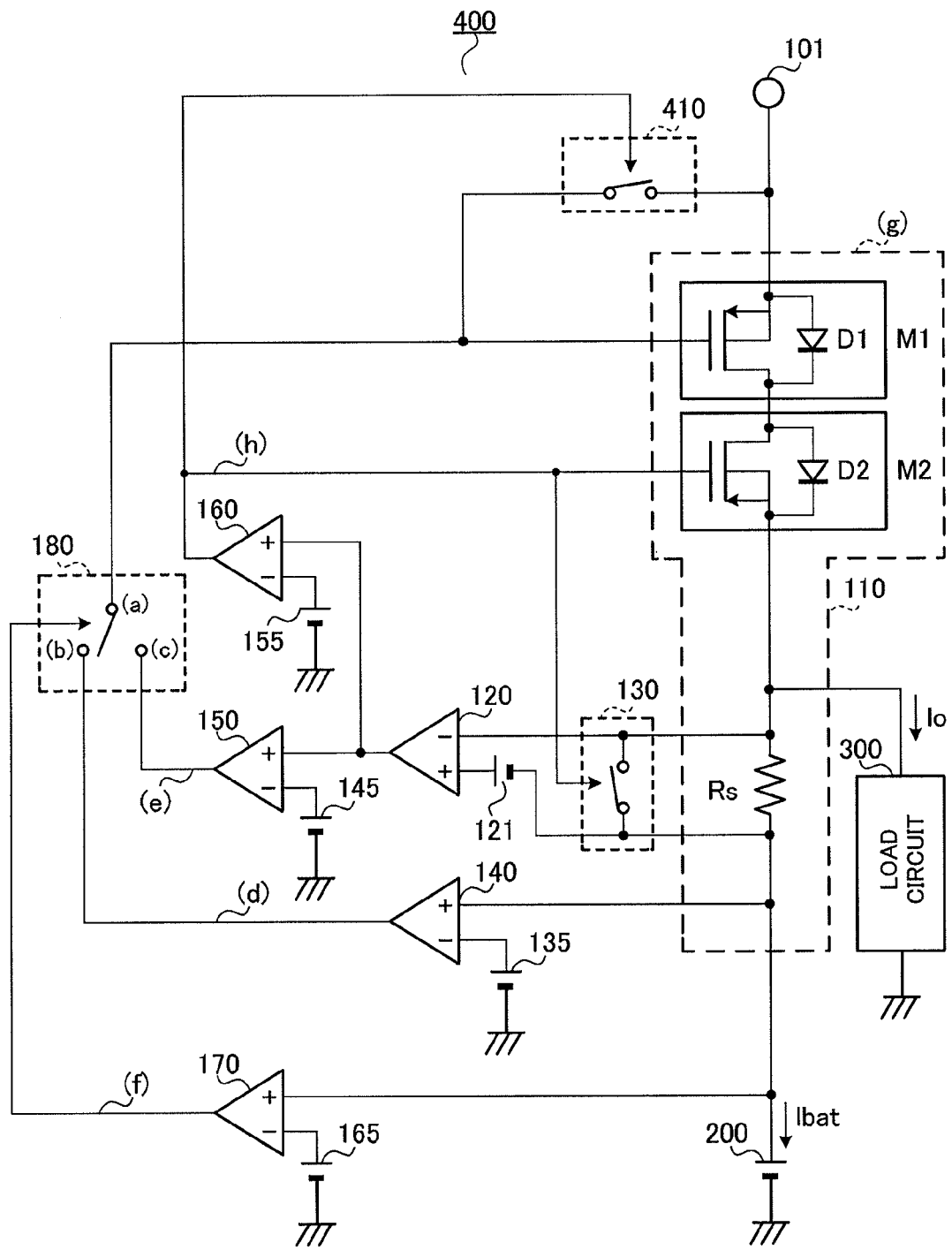
FIG. 8 is a circuit diagram showing a configuration of a charging apparatus according to Embodiment 2 of the present invention.

FIG. 8 is a circuit diagram showing a configuration of the charging apparatus according to Embodiment 2 of the present invention. In this embodiment, the parts that are the same as those in FIG. 3 will be assigned the same reference numerals.

In FIG. 8, charging apparatus 400 has: AC adapter input terminal 101 that receives an output DC voltage of an AC adapter; charging section 110 that is configured with P-channel MOS transistors M1 and M2 and current detecting resistance Rs; current difference amplifier 120 that has a negative input terminal connected between P-channel MOS transistor M2 and current detecting resistance Rs, and a positive input terminal connected between current detecting resistance Rs and battery 200 via constant voltage source 121, and that amplifies the detected voltage of current detecting resistance Rs; switch 130 that short-circuits current detecting resistance Rs based on a comparison result of comparator 160; switch 410 that short-circuits the path between the source and the gate of P-channel MOS transistor M1 based on the comparison result of comparator 160; voltage difference amplifier 140 that amplifies the voltage difference between the battery voltage and the reference voltage generated by reference voltage source 135; voltage difference amplifier 150 that amplifies the voltage difference between the output voltage of current difference amplifier 120 and the reference voltage generated by reference voltage source 145; comparator 160 that compares the output voltage of current difference amplifier 120 with the reference voltage generated by reference voltage source 155; comparator 170 that compares the output voltage of voltage difference amplifier 140 with the reference voltage generated by reference voltage source 165; and switch 180 that selects one of the output (e) of voltage difference amplifier 150 and the output (d) of voltage difference amplifier 140 and applies the result to the gate of P-channel MOS transistor M1.

Charging apparatus 400 adopts a configuration adding switch 410 that short-circuits the path between the source and the gate of P-channel MOS transistor M1, to charging apparatus 100 in FIG. 3. Switch 410 is driven by comparator 160, and is opened and closed in synchronization with switch 130.

Figure 9:
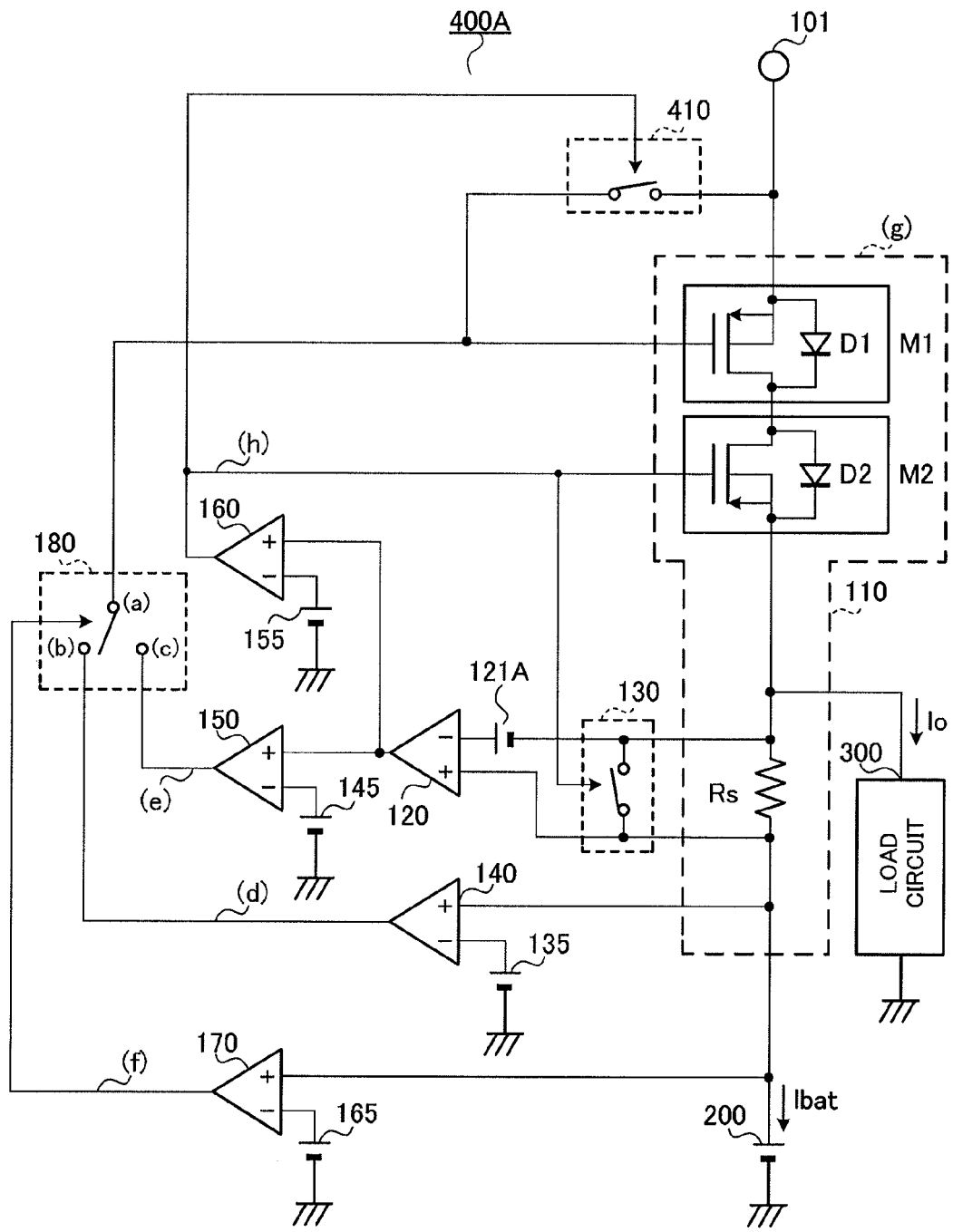
FIG. 9 is a circuit diagram showing another configuration of the charging apparatus according to Embodiment 2.

FIG. 9 is a circuit diagram showing another configuration of the charging apparatus according to Embodiment 2, and the only difference is the configuration of the input terminal part of the current difference amplifier connected to current detecting resistance Rs.

In FIG. 9, in current difference amplifier 120 of charging apparatus 400A, the negative input terminal is connected between P-channel MOS transistor M2 and current detecting resistance Rs via constant voltage source 121A, and the positive input terminal is connected between current detecting resistance Rs and battery 200.

Further, current difference amplifier 120 of charging apparatus 400A has constant voltage source 121A configured with constant current supply 122A and resistance 123A connected to the positive input terminal. Constant voltage source 121A shifts the input potential of the negative input terminal of current difference amplifier 120 by predetermined potentials.

The operation of the charging apparatus configured as described above will be described below. Charging apparatus 400 shown in FIG. 8 operates in the same way as charging apparatus 400A shown in FIG. 9, and therefore only the operation of charging apparatus 400 will be described as an example.

Figure 10:
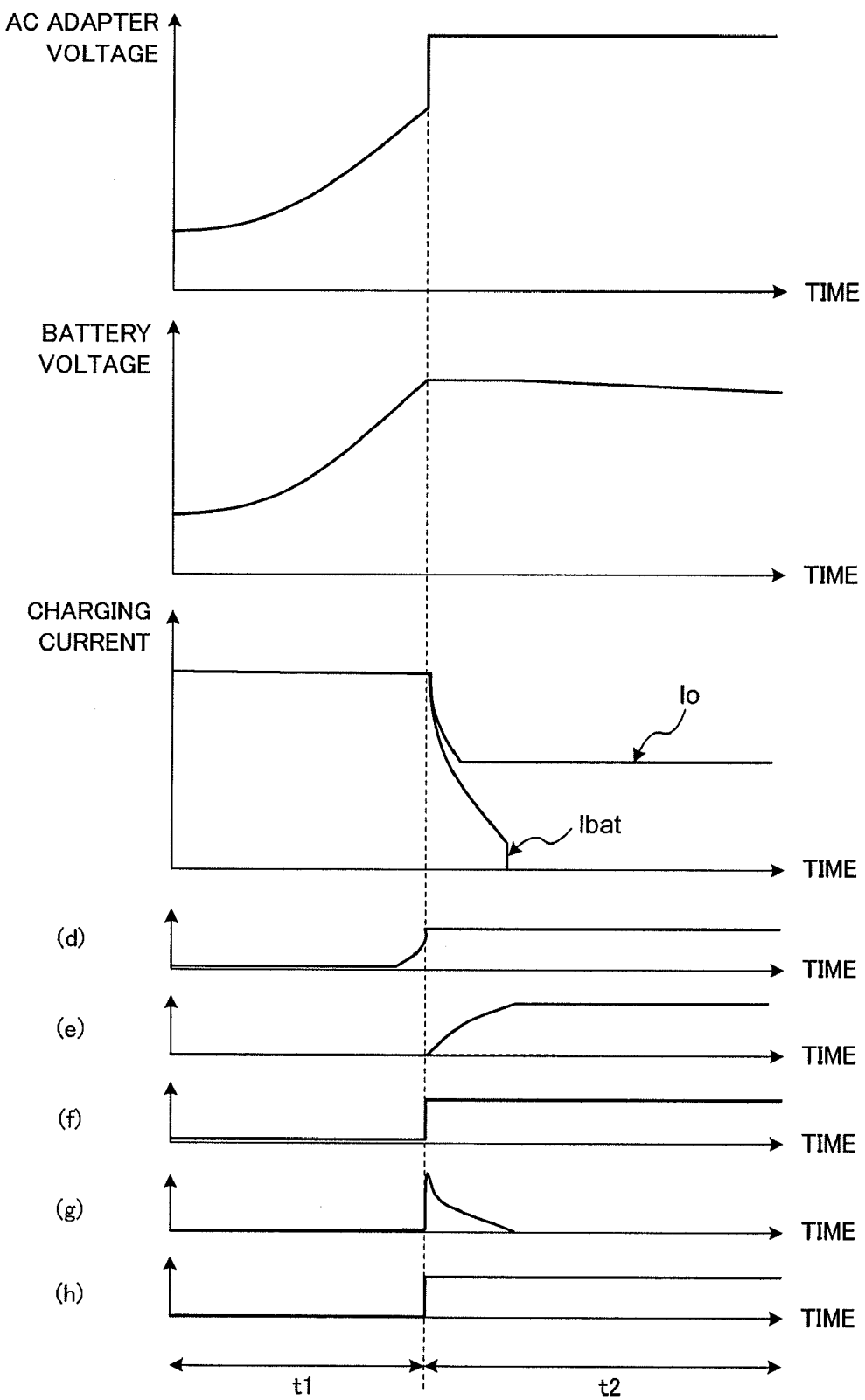
FIG. 10 is a timing chart illustrating the operation of the charging apparatus according to Embodiment 2.

FIG. 10 is a timing chart illustrating the operation of charging apparatus 400, and shows the operation timing and waveform of each section in FIG. 3. FIG. 10 shows an AC adapter voltage when the AC adapter is connected to AC adapter input terminal 101, the battery voltage, the charging current, the output voltage (d) of voltage difference amplifier 140, the output voltage (e) of voltage difference amplifier 150, the output voltage (f) of comparator 170, the amount of heat (g) produced in P-channel MOS transistor M1, and the output voltage (h) of comparator 160. Further, Io is current flowing into load circuit 300, and Ibat is current flowing into battery 200.

The operation of above-described charging apparatus 400 for the case where current supplied to load circuit 300 is large (Io>>Ibat) will be described in detail using the timing chart of FIG. 10.

[Period t1]

The AC adapter voltage is inputted to AC adapter input terminal 101, the charging current increases, the AC adapter voltage decreases, and the battery voltage increases. In this period t1, switch 410 is opened, and the charging apparatus operates in the same way as in period t1 of Embodiment 1.

[Period t2]

The charging current decreases, the AC adapter voltage returns to a predetermined voltage that does not cause droop, the battery voltages reaches the desired voltage, and current flowing into battery 200 Ibat decreases, but load continues flowing as supply current for load circuit 300. In this period t2, the battery voltage is almost fully charged, and so the output voltage (d) of voltage difference amplifier 140 becomes high.

When above (d) is high and (a) and (c) of switch 180 are connected, the output voltage (f) of comparator 170 becomes high, and so charging apparatus 400 operates by constant voltage control.

Further, the charging current decreases, and the output voltage (e) of voltage difference amplifier 150 becomes high.

The output voltage of current difference amplifier 120 is high, and so the output voltage (h) of comparator 160 becomes high, P-channel MOS transistor M2 does not operate, and switch 410 is closed, and so P-channel MOS transistor M1 does not operate, and switch 130 is also closed, and so current detecting resistance Rs is short-circuited. In this state, power is directly supplied to load circuit 300 from battery 200 where charging is finished, via switch 130.

In this way, according to this embodiment, as in Embodiment 1, even when the AC adapter is connected and there is heavy load, after charging is completed, power is supplied to the load from the battery via switch 130, so that it is possible to reduce heat produced due to the power loss of P-channel MOS transistors M1 and M2 which are control transistors.

Particularly, with this embodiment, even if the AC adapter fails during charging and the AC adapter voltage decreases rapidly, power is not supplied from the AC adapter side to load circuit 300, and the power loss of P-channel MOS transistor M1 does not occur. That is, it is possible to realize further improvement in safety, in addition to reduction in cost and area for implementing the control transistor.

Examples of preferred embodiments of the present invention have been described above, and the scope of the present invention is by no means limited to the above-described embodiments.

For example, in the above-described embodiments, configurations are adopted where P-channel MOS transistors M1 and M2 are connected in series on the charging current path from AC adapter input terminal 101 to battery 200, but the present invention is not limited to these configurations. It is also possible to use a bipolar transistor as P-channel MOS transistor M1. Further, P-channel MOS transistor M2 operates as a switch for preventing countercurrent, and therefore, although forward loss increases, a diode can be used.

Further, switch 130 and switch 410 are preferably semiconductor switches that are configured with MOS transistors or bipolar transistors so as to be controlled in a simple manner and formed in the same semiconductor integrated circuit with other circuit elements.

Further, the types and polarities of transistors including control transistors are not limited to those described in the above embodiments. For example, P-channel MOS transistors M1 and M2 configuring a control transistor can be configured with N-channel MOSFET (although the circuit configuration is different).

Further, the above-described embodiments are examples where the present invention is applied to charging apparatuses, but any circuit configuration is possible if a power supply apparatus charges a secondary battery from a DC power supply via a control transistor. Still further, a power supply circuit having the above-described charging apparatus is also possible.

Furthermore, in the above-described embodiments, "charging apparatus" is used for convenience of explanation, but the charging apparatus may also be referred to as "charging control circuit," "charger," "power supply apparatus," and so on.

Further, the type, number and connection method of circuit sections configuring the above-described charging apparatus, such as switch elements, are not limited to the above-described embodiments. Although, for example, MOS transistors are generally used as switch elements, any switch element is possible if the switch element performs switch operation.

As described above, according to the present invention, even when the AC adapter is connected and there is heavy load, after charging is completed, power is directly supplied to the load from the battery, so that it is possible to reduce heat produced due to the power loss of the control transistor, reduce cost and area for implementing the charging control transistor, and, furthermore, improve safety. Therefore, the charging apparatus according to the present invention is suitable for use as charging apparatuses of mobile telephones, and the like, and can be widely applied to charging apparatuses in electronic devices other than mobile devices.

What is claimed is:

1. A charging apparatus that charges a secondary battery from a direct current power supply via a control transistor, the charging apparatus comprising:

a current detecting resistance that is connected between a current output terminal of the control transistor and the secondary battery in series and detects charging current;

a terminal that is configured for connection to a load circuit and that is provided between the current output terminal of the control transistor and the current detecting resistance;

a switch section that is arranged on a path that bypasses the current detecting resistance; and a control section that detects current flowing into the secondary battery, and closes the switch section and short-circuits the current detecting resistance when the detected charging current is equal to or less than a predetermined value.

2. The charging apparatus according to claim 1, further comprising a load circuit that is connected to the terminal and that receives a power supply from one of the direct current supply and the secondary battery.

3. The charging apparatus according to claim 1, wherein the control section switches off the control transistor when the detected charging current is equal to or less than the predetermined value.

4. The charging apparatus according to claim 1, wherein the control transistor comprises a metal-oxide semiconductor (MOS) transistor.

5. The charging apparatus according to claim 1, wherein the switch section comprises a metal-oxide semiconductor (MOS) transistor.

* * * * *